(12) United States Patent
Courtès

(10) Patent No.: US 11,178,387 B2
(45) Date of Patent: Nov. 16, 2021

(54) IMAGE CAPTURE METHOD AND SYSTEM USING A VIRTUAL SENSOR

(71) Applicant: Alexandre Courtès, Paris (FR)

(72) Inventor: Alexandre Courtès, Paris (FR)

( * ) Notice: Subject to any disclaimer, the term of this patent is extended or adjusted under 35 U.S.C. 154(b) by 0 days.

(21) Appl. No.: 16/310,314

(22) PCT Filed: Jun. 16, 2017

(86) PCT No.: PCT/FR2017/051589
§ 371 (c)(1),
(2) Date: Dec. 14, 2018

(87) PCT Pub. No.: WO2017/216503
PCT Pub. Date: Dec. 21, 2017

(65) Prior Publication Data
US 2019/0335161 A1 Oct. 31, 2019

(30) Foreign Application Priority Data
Jun. 17, 2016 (FR) ..................................... 1655669

(51) Int. Cl.
*H04N 5/247* (2006.01)
*H04N 5/268* (2006.01)
(Continued)

(52) U.S. Cl.
CPC ........... *H04N 13/282* (2018.05); *H04N 5/217* (2013.01); *H04N 5/247* (2013.01); *H04N 5/268* (2013.01)

(58) Field of Classification Search
None
See application file for complete search history.

(56) References Cited

U.S. PATENT DOCUMENTS 6,005,548 A * 12/1999 Latypov .................. A63F 13/00
345/156
6,545,705 B1 * 4/2003 Sigel ........................ G07C 1/24
348/157

(Continued)

FOREIGN PATENT DOCUMENTS

DE 10 2014 010 756 A1 1/2016
WO 2006/024078 A1 3/2006
WO 2008/151416 A1 12/2008

OTHER PUBLICATIONS

Machine level translation pf Alexander, DE 102014010756 A1.*
International Search Report, dated Aug. 23, 2017, from corresponding PCT application No. PCT/FR2017/051589.

*Primary Examiner* — Mohammad J Rahman
(74) *Attorney, Agent, or Firm* — Nixon & Vanderhye

(57) ABSTRACT

Disclosed is an image capture method using a virtual tracking sensor, implemented in an image capture system including wide-field image acquisition devices, each placed at a different fixed position along the course, such that the images captured at a given instant in time by two different acquisition devices represent different points of view of athletes traveling over the course. The method includes: capturing, in real time, images representative of an area in space that is substantially equivalent to the predetermined course, by each acquisition device of the plurality; selecting, for each instant in time of a plurality of successive instants in time, a given acquisition device and a portion of the image captured thereby at the instant in time; and reconstructing, on the basis of the selected image portions, a video sequence similar to that which would have been captured by an acquisition device moving along the course.

14 Claims, 5 Drawing Sheets

(51) Int. Cl.
*H04N 5/217* (2011.01)
*H04N 13/282* (2018.01)

(56) References Cited

U.S. PATENT DOCUMENTS

| | | | | |
|---|---|---|---|---|
| 6,665,342 B1* | 12/2003 | Brown | ............ | G08B 13/19602 |
| | | | | 348/E5.054 |
| 7,849,487 B1* | 12/2010 | Vosseller | ............. | G11B 15/026 |
| | | | | 725/102 |
| 8,249,153 B2 | 8/2012 | Lestage et al. | | |
| 8,723,956 B2 | 5/2014 | Anderson | | |
| 9,530,213 B2* | 12/2016 | Gharib | ................ | G02B 3/0056 |
| 10,220,303 B1* | 3/2019 | Schmidt | .................. | A63F 13/04 |
| 2003/0095788 A1* | 5/2003 | Murakami | ........... | G11B 27/032 |
| | | | | 386/216 |
| 2005/0259888 A1* | 11/2005 | Ozluturk | ............ | H04N 5/23254 |
| | | | | 382/260 |
| 2007/0279494 A1* | 12/2007 | Aman | .................... | G06T 7/269 |
| | | | | 348/169 |
| 2010/0026809 A1* | 2/2010 | Curry | .................... | H04N 5/232 |
| | | | | 348/157 |
| 2012/0057852 A1* | 3/2012 | Devleeschouwer | ... | H04N 5/262 |
| | | | | 386/278 |
| 2012/0069224 A1* | 3/2012 | Cilia | .................. | H04N 5/23296 |
| | | | | 348/240.99 |
| 2012/0092475 A1* | 4/2012 | Li | ...................... | H04N 21/4781 |
| | | | | 348/77 |
| 2013/0063621 A1* | 3/2013 | Ito | ......................... | H04N 5/772 |
| | | | | 348/222.1 |
| 2013/0141525 A1* | 6/2013 | Williams | ................. | H04N 7/00 |
| | | | | 348/38 |
| 2014/0150042 A1* | 5/2014 | Pacor | .............. | H04N 21/21805 |
| | | | | 725/116 |
| 2014/0245367 A1* | 8/2014 | Sasaki | ............... | H04N 21/6175 |
| | | | | 725/109 |
| 2014/0336848 A1* | 11/2014 | Saund | .................. | G08G 1/054 |
| | | | | 701/3 |
| 2015/0264258 A1 | 9/2015 | Bervoets et al. | | |
| 2015/0341617 A1* | 11/2015 | Cole | .................... | H04N 13/246 |
| | | | | 348/36 |
| 2015/0347827 A1* | 12/2015 | Dickinson | .......... | G06K 9/00302 |
| | | | | 382/103 |
| 2018/0035075 A1* | 2/2018 | Lee | .................... | H04N 5/23216 |

\* cited by examiner

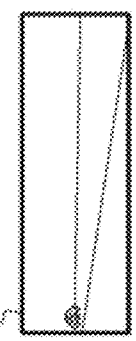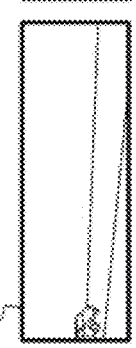
Fig. 2

IMAGE CAPTURE METHOD AND SYSTEM USING A VIRTUAL SENSOR

FIELD OF THE INVENTION

The present invention relates to image capture systems, which may for example equip circuits or courses for high-speed sports.

It relates in particular to an image capture method using a virtual sensor for tracking a sportsperson or sports equipment moving at high speed over a predetermined course, said method making it possible to produce a video sequence, as well as an image capture system.

CONTEXT OF THE INVENTION

Image capture takes place in numerous applications, making it necessary to satisfy increasingly specific constraints.

One example of application is video capture of an object (or subject) moving at very high speed, typically in a high-speed sports context, for example a sportsperson (for example a skier) or sports equipment such as a ball or a racing motor vehicle. Such a vehicle may travel at speeds of the order of 300 km/hour.

Video capture of such a subject, for example for television or cinema, is generally carried out using another vehicle (e.g. a drone) carrying a video acquisition device and moving at a similar speed so as to track the sportsperson or vehicle ("tracking shot").

However, in view of the speed of movement involved, for example of the order of several hundred km/hour for a vehicle, a certain degree of dexterity is required for operating the tracking system, and it only offers a small margin for manoeuvre with respect to image capture (the viewing angle is predetermined) and focus. For example, a change of focus is generally achieved by zooming-in on the sportsperson or vehicle, which has the effect of cancelling the impression of speed for the spectator.

Moreover, the movement of tracking systems near the sportsperson may lead to safety problems. In fact, the tracking system may inadvertently obstruct and crash into the sportsperson or sports equipment through an operating error or a mechanical problem with the tracking system. Furthermore, the movement of one or more tracking systems on the course (or circuit) may obstruct the sportsperson's clear view of the course and thus increase the risk of an accident. There is therefore a need to improve the reliability, safety and flexibility of the existing video capture systems for filming sportspersons (or their equipment/vehicles) moving at very high speed.

SUMMARY OF THE INVENTION

The present invention thus aims to overcome at least one of these drawbacks.

In this context, a first aspect of the invention relates to an image capture method using a virtual sensor for tracking a sportsperson or sports equipment moving at high speed over a predetermined course of a scene, implemented in an image capture system. This image capture system comprises a plurality of wide-field image acquisition devices each arranged at a different fixed position along the predetermined course, so that the images captured at a given instant by two different acquisition devices represent different viewpoints of the sportsperson or sports equipment moving over the predetermined course. The method comprises the following steps:

capturing, in real time, images that are representative of a zone of space substantially equivalent to the predetermined course, by each acquisition device of said plurality;

selecting, for each instant of a plurality of successive instants, a given acquisition device and a portion of the image captured by the latter at said instant and reconstructing, from the selected image portions, a video sequence similar to that which would have been captured by an acquisition device moving along said course.

Thus, this method makes it possible to capture a plurality of images of the same scene at the same instant but having different viewpoints, thus offering an operator a wide choice of shots and also making it possible for them to vary the relative speed of the subject and the virtual sensor in the reconstructed video sequence.

Correlatively, a second aspect of the invention relates to an image capture system using a virtual sensor for tracking a sportsperson or sports equipment moving at high speed over a predetermined course of a scene. This system comprises:

a plurality of wide-field image acquisition devices each arranged at a different fixed position along the predetermined course, so that the images captured at a given instant by two different acquisition devices represent different viewpoints of the sportsperson or sports equipment moving over the predetermined course, each acquisition device comprising means for capturing, in real time, images that are representative of a zone of space substantially equivalent to the predetermined course;

an image processing device configured for:
obtaining images captured in real time by the acquisition devices;
selecting, for each instant of a plurality of successive instants, a portion of the image captured at said instant by a given acquisition device; and
reconstructing, from the selected image portions, a video sequence similar to that which would have been captured by an acquisition device moving along said course.

Advantageously, the image capture system allows good flexibility in the reconstruction of the video sequence, while avoiding the problems relating to safety and accidents, since the acquisition devices are fixed along the course and are not moving close to the sportsperson as in the prior art.

Other features of the method and system according to embodiments of the invention are described in the dependent claims.

In a particular embodiment, the relative speed of the sportsperson or sports equipment and the virtual sensor varies during the reconstructed video sequence.

In a particular embodiment, the method comprises a preliminary step of setting up the image capture system comprising the following steps:

installing the acquisition devices of the plurality along the predetermined course, in such a way that each acquisition device films a zone of space substantially equivalent to the predetermined course, and in such a way that the images captured at a given instant by two different acquisition devices represent different viewpoints of the sportsperson or sports equipment moving over the predetermined course; and parameterizing an image processing device to which each acquisition device of the plurality is connected, with data of relative position of the acquisition devices of the plurality.

In a particular embodiment, the method further comprises a step of processing the selected image portions in order to avoid image jumping between two successive instants of the video sequence.

This can be done by means of a linearization function calculated at the time of setting up the system, for example on the basis of images of the course alone (i.e. without the sportsperson or sports equipment, just the setting). According to a particular embodiment, this processing may in addition use a tracking algorithm, making it possible to fix the relative distance between the virtual sensor and the sportsperson or else the relative speed between these two elements.

Correlatively, in a particular embodiment, the image processing device of the capture system is configured for processing the selected image portions in order to avoid image jumping between two successive instants of the video sequence.

In a particular embodiment, the method further comprises a step of correcting the optical distortion of the images captured by the acquisition devices.

Correlatively, in a particular embodiment, the processing device is also configured for correcting the optical distortion of the images captured by the acquisition devices.

In a particular embodiment, the method further comprises a step of storing said captured images in the system for a predetermined duration, in order to allow the subsequent application of new steps of selection and reconstruction, starting from the stored images.

This allows a video sequence to be reconstructed a posteriori, for example to return to a past event with specific parameters (viewing angle, speed, zoom, framing, etc.).

In a particular embodiment, the image capture system further comprises a human-machine interface comprising display means configured for displaying all of the acquisition devices together with the images captured by these acquisition devices.

In a particular embodiment, the human-machine interface further comprises switching means configured for switching from a given acquisition device to another so as to generate a selection command for the attention of the processing device.

In a particular embodiment, the switching means are configured for switching from a given acquisition device to another acquisition device as a function of an image portion selected via the human-machine interface, the display means being additionally configured for displaying a signalling element delimiting the image portion selected.

The advantages, aims and particular features of the system are similar to those of the aforementioned method.

In a particular embodiment, the various steps of the aforementioned method are determined by computer program instructions.

Consequently, the invention also relates to a computer program on a data medium, this program being usable by a microprocessor and comprising instructions suitable for implementing the steps of the method as mentioned above.

This program may use any programming language, and may be in the form of source code, object code, or code intermediate between source code and object code, such as in a partially compiled form, or in any other desirable form.

The invention also relates to a data medium readable by a microprocessor, and comprising computer program instructions as mentioned above.

The data medium may be any entity or device capable of storing the program. For example, the data medium may comprise a storage means, such as a ROM (Read Only Memory), for example a microcircuit ROM, or else a magnetic recording means, for example a hard disk, or else a flash memory.

Moreover, the data medium may be a transmissible data medium such as an electrical or optical signal, which can be forwarded via an electric or optical cable, by radio or by other means. The program according to the invention may in particular be downloaded from a storage platform of a network of the Internet type.

Alternatively, the data medium may be an integrated circuit in which the program is incorporated, the circuit being suitable for executing or for being used in the execution of the method in question.

The aforementioned data medium and computer program have features and advantages similar to the method that they implement.

BRIEF DESCRIPTION OF THE FIGURES

Other features and advantages of the invention will become more apparent in the following description, illustrated by the attached figures, which illustrate embodiment examples thereof, which are in no way limitative. In the figures:

FIG. 2 is a diagrammatic representation of a series of images resulting from steps of capture in real time according to particular embodiments of the invention;

DETAILED DESCRIPTION OF THE INVENTION

In general, the present invention makes it possible to carry out virtual tracking, allowing a user of the image capture system (typically a camera operator) to navigate virtually in a video channel, i.e. change the viewpoint in real time and for example carry out virtual modification of the speed or direction of movement of a virtual sensor.

With the present invention, it is possible to obtain images similar to those obtained by tracking the subject (e.g. a sportsperson or sports equipment), for example parallel to their movement, with the additional advantage of being able to alter the relative speed of the virtual sensor relative to the moving object.

Thus, a larger number of different viewpoints may be envisaged during one and the same video capture than in the prior art.

Figure 1:
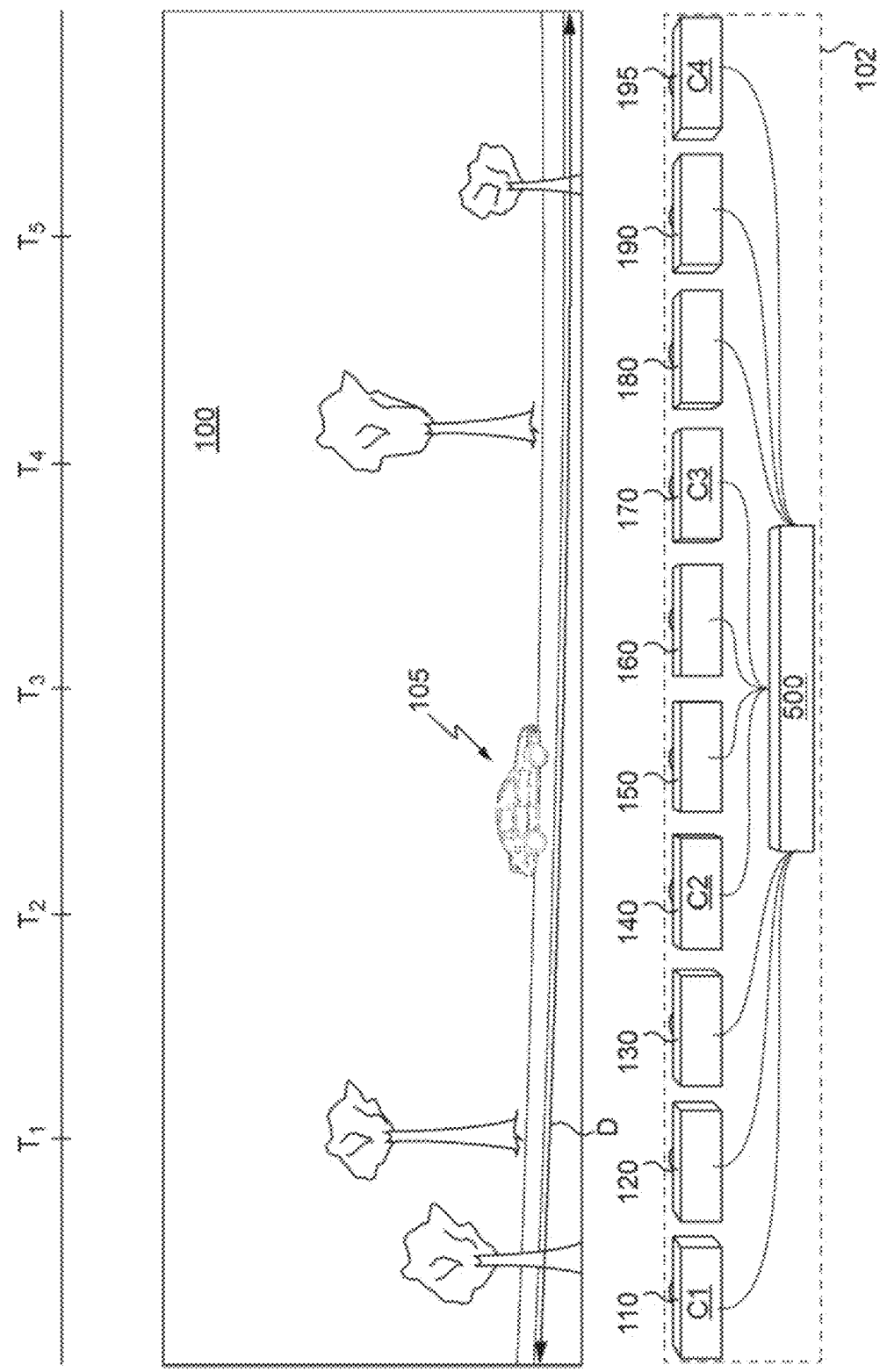
FIG. 1 is a diagrammatic representation of a context in which particular embodiments of the invention may be used.

FIG. 1 is a diagrammatic representation of a context in which embodiments of the invention may be implemented.

In particular, it is a context in which an image capture system according to embodiments may be installed. The image capture system will be described in detail with reference to FIG. 5.

In this example, a course (or circuit) of a scene 100 with a linear length D is considered. A sportsperson or sports equipment, here a racing car 105, moves at high speed on this predetermined course. An image capture system 102 according to the invention is installed along this course.

This image capture system 102 comprises in particular a plurality of wide-field image acquisition devices 110, 120, 130, 140, 150, 160, 170, 180, 190, 195 each arranged at a different fixed position along the predetermined course. The present invention is not limited to the number of devices shown in this figure, which is only supplied for purposes of illustration.

In certain embodiments, the acquisition devices are arranged at regular intervals along the course, as shown in the figure. However, this is not obligatory, and according to other embodiments they are arranged irregularly.

The distance between the acquisition devices may be selected as a function of the speed of the sportsperson or equipment and/or the length of the course to be covered.

The acquisition devices are capable of filming the scene 100 with relatively different viewpoints. In particular, they each film a zone approximately corresponding to the course with length D.

Each acquisition device has means for real-time capture of images representative of a zone of space substantially equivalent to the predetermined course. For this purpose, the acquisition devices operate continuously and are connected to an image processing module (not shown), which stores and processes the images continuously, as will be explained with reference to the following figures. In certain embodiments, the acquisition devices implement certain processing (e.g. correction) locally, whereas the processing module carries out other processing in a centralized manner. It might also be envisaged that certain given acquisition devices having the necessary computing power carry out part of the processing locally, for example for other acquisition devices.

These image acquisition devices are preferably video cameras equipped with a fisheye lens. Such a lens is characterized by a relatively short focal length and therefore a large field angle, which may be up to about 180° in the diagonal, or even in the whole image. Other lenses may be envisaged, for example having a field angle greater than 180°, typically used for applications using the IMAX image format (IMAX is a trademark).

According to the invention, each of the acquisition devices is arranged in such a way that the images captured at a given instant by two different acquisition devices show different viewpoints of the racing car 105 moving along the course.

In this example, it is assumed that the car 105 is on the course at the level of marker $T_1$ at instant $t_1$, at the level of marker $T_2$ at instant $t_2$, at the level of marker $T_3$ at instant $t_3$, at the level of marker $T_4$ at instant $t_4$, and at the level of marker $T_5$ at instant $t_5$.

Thus, as shown in FIG. 2, the acquisition devices $C_1$ (110), $C_2$ (140), $C_3$ (170) and $C_4$ (195) capture, at a instant $t_1$, four different views referenced 210, 212, 214, 216 respectively, of the car 105 along the course.

Owing to the respective position of acquisition devices $C_1$ (start of the course), $C_2$ (first half of the course), $C_3$ (second half of the course) and $C_4$ (end of the course) along the course, the car 105 is seen, at a given instant, from behind by acquisition device $C_1$, from the side by acquisition devices $C_2$ and $C_3$, and from the front by acquisition device $C_4$. Thus, assuming that the course is rectilinear, the acquisition devices $C_1$, $C_2$, $C_3$ and $C_4$, respectively, film the whole of the course and each has in its field the start, the middle and the end of the course.

At a instant $t_2$ subsequent to $t_1$, the acquisition devices $C_1$ (110), $C_2$ (140), $C_3$ (170) and $C_4$ (195) capture four (other) different views referenced 220, 222, 224, 226 respectively, of the car 105 along the course.

Similarly:

at an instant $t_3$ subsequent to $t_2$, the acquisition devices $C_1$ (110), $C_2$ (140), $C_3$ (170) and $C_4$ (195) capture four (other) different views referenced 230, 232, 234, 236 respectively, of the car 105 along the course;

at an instant $t_4$ subsequent to $t_3$, the acquisition devices $C_1$ (110), $C_2$ (140), $C_3$ (170) and $C_4$ (195) capture four (other) different views referenced 240, 242, 244, 246 respectively, of the car 105 along the course;

at an instant $t_5$ subsequent to $t_1$, the acquisition devices $C_1$ (110), $C_2$ (140), $C_3$ (170) and $C_4$ (195) capture four (other) different views referenced 250, 252, 254, 256 respectively, of the car 105 along the course.

Thus, the image capture system according to the invention makes it possible, at a given instant, to have several viewing angles of one and the same object, which is not possible with a tracking system of the prior art.

Figure 3:
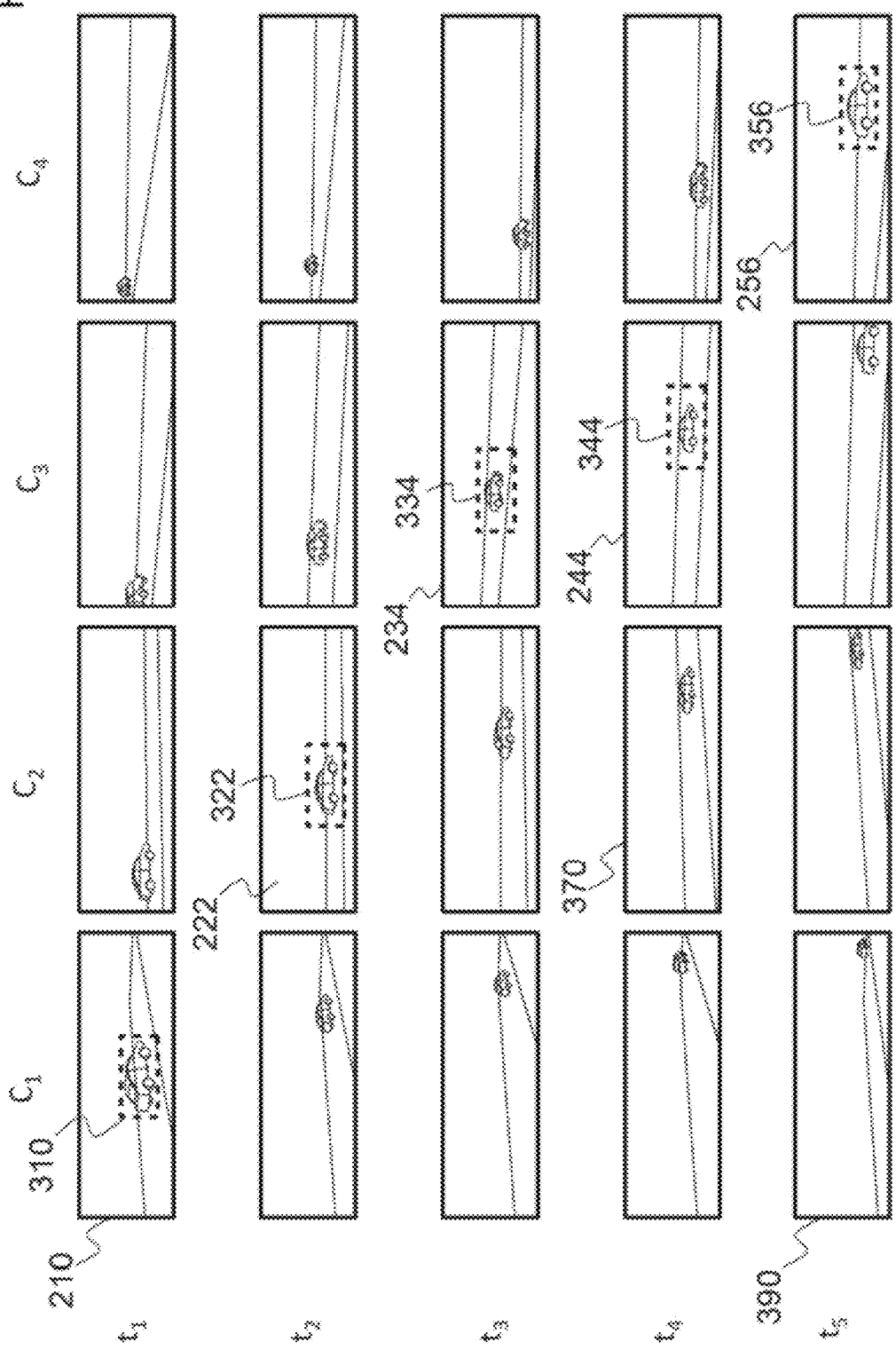
FIG. 3 is a diagrammatic representation of the result of steps of selecting image portions based on the series of images in FIG. 2.

As shown in FIG. 3, the image capture system according to the invention makes it possible to select, in real time, the viewing angle and the desired image portion, in order to reconstitute a video sequence captured by a dummy sensor (virtual sensor) moving virtually along said course, according to the parameters of speed and viewing angle selected by a user, from the available images originating from the various acquisition devices.

Thus, for example at instant $t_1$, the image portion 310 of image 210 captured by acquisition device $C_1$ (110) is selected, whereas at instant $t_2$, the image portion 322 of image 222 captured by acquisition device $C_2$ (140) is selected, these two acquisition devices having different viewpoints of the same course. At instants $t_3$ and $t_4$, the image portions 334 and 344 of images 234 and 244 captured successively by the acquisition device $C_3$ (170) are selected. Thus, these images are taken from the same viewpoint. At instant $t_5$, the image portion 356 of the image 256 captured by the acquisition device $C_4$ is selected. The viewpoint is then different once again.

The image portions selected are then arranged in sequence as a function of the corresponding instants, thus forming a video sequence. This video sequence reconstructed from the selected image portions thus combines several viewing angles in such a way that the visual effect for the spectator is much more attractive than in the prior art as it makes it possible to render the speed of the car 105 with some degree of fidelity, while avoiding the problems of safety and reliability connected with the conventional image capture systems. Furthermore, the viewpoint to be rendered at a given instant may be selected a posteriori.

Figure 4:
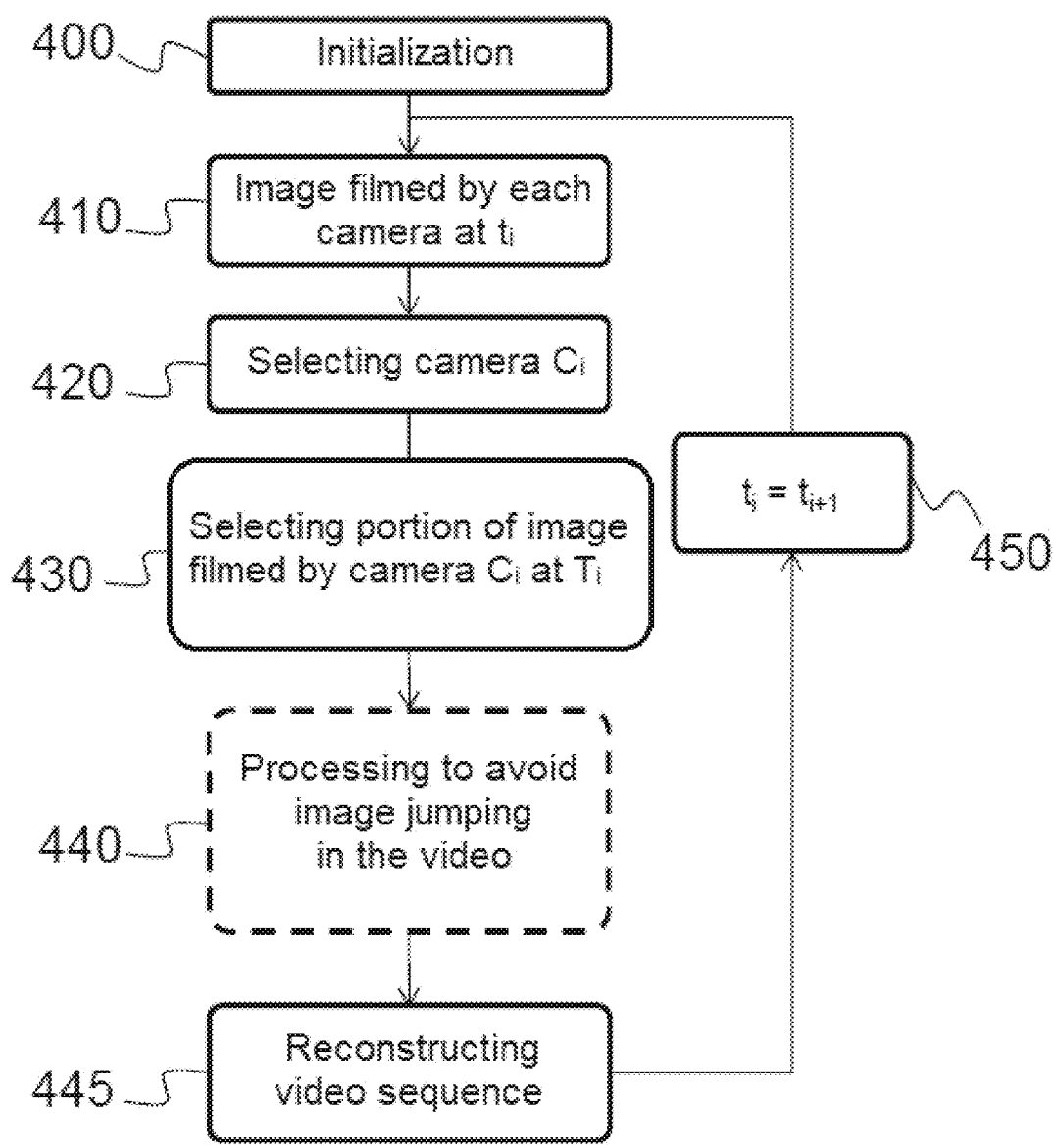
FIG. 4 shows general steps of an image capture method according to particular embodiments of the invention.

FIG. 4 shows general steps of an example of an image capture method according to particular embodiments of the invention. These steps are typically implemented in an image capture system, for example as described with reference to FIG. 1.

In a preliminary step 400, the image capture system 102 is set up along the course on which a sportsperson or sports equipment such as the car 105 moves at high speed.

In practice, this step comprises installing the acquisition devices along the course, in such a way that each acquisition device films a zone of space substantially equivalent to said course, and in such a way that the images captured at a given instant by two different acquisition devices represent different viewpoints of the sportsperson or sports equipment moving along the course. Thus, the acquisition devices are arranged so as to give an overlap of field such that the length D of the course is covered continuously.

Next, the acquisition devices are connected to an image processing device. This processing device is then parameterized with configuration data of the acquisition devices thus installed. These configuration data comprise for example the relative position of the acquisition devices as well as synchronization and calibration data (e.g. luminosity, colour temperatures, framing and distortions).

In other words, these data make it possible to parameterize the various acquisition devices so that the images of the course captured by the latter 'agree'. This may be carried out by capturing images of the course alone, i.e. without the presence of elements such as a car or a person.

Parameterization may thus comprise a step of detecting a series of reference points (registration marks) for each pair of acquisition devices. This makes it possible to pre-calculate a linearization function in order to facilitate the operations of smoothing from one image to another and thus avoid jumping between successive images of the video sequence (see step 440 described below), which may have originated from different sensors. In other words, an algorithm may be applied to captured images of the course alone, in order to correct the images originating from the various acquisition devices to ensure a degree of coherence between them. For example, it is ensured that the horizontality of the course is the same for all the acquisition devices. In practice, this may be done by comparing the images of the course alone captured by the various acquisition devices with the image of the course alone captured by a reference acquisition device, for example located at the mid-point of the course. According to an embodiment, this parameterization is essentially digital.

These data are important for processing the video streams originating from the various acquisition devices, as explained below.

After that, each acquisition device captures in real time, i.e. continuously, images representative of the aforementioned zone, substantially equivalent to the course being observed.

The next steps of the method represented are carried out iteratively, at each instant $t_i$.

During a step 410, the processing device recovers the images captured by the various acquisition devices at the instant $t_i$ considered.

For example, at the instant $t_i=t_1$, it is a matter of recovering the images 210, 212, 214, 216 shown in FIG. 2, as well as the images captured at instant $t_1$ by the other acquisition devices, i.e. here, all the acquisition devices 110 to 195 of the system 102.

In practice, a step of correcting the optical distortion of the images captured by the acquisition devices may be carried out. In fact, as mentioned above, the acquisition devices are preferably equipped with fisheye lenses, which give an image of a round shape, flattening of which leads to significant optical distortions, in particular at the periphery of the image.

A mapping algorithm may be applied to such images. Such an algorithm consists for example of defining a destination format for the image to be corrected and determining the coordinates of the pixels in the destination reference as a function of the coordinates of these pixels in the source image (i.e. to be corrected). There are many algorithms for carrying out such a correction.

During a step 420, a given acquisition device, designated $C_i$, is selected. For example, at the instant $t_i=t_1$, the acquisition device 110 shown in FIG. 1 may be selected.

This selection may be done in two ways: either automatically as a function of parameters predetermined by an operator in a preliminary step or in the course of the method (for example a camera operator), or in real time by the operator, via a human-machine interface of the system 102, for example a pedal, a lever, a button or a touch screen.

For example, the parameter predetermined by an operator may be the relative speed of the virtual sensor produced and of the vehicle observed 105. Thus, selection of the acquisition device at a given instant is carried out automatically by the system so as to respect this relative speed during the video sequence to be reconstructed.

In a particular embodiment, predetermined selection scripts defining a framing grammar (for example "tracking in", "tracking out", "tracking left/right", "long shot", "medium shot", "close up", well known to a person skilled in the art) are implemented and the operator triggers their execution via the human-machine interface, for example by pressing a button or a pedal. Such scripts may be implemented for a video sequence, i.e. for several or all the iterations considered. These scripts are for example loaded in the processing device at the time of the preliminary step 400 of installation of the system 102. The operator then expresses his creativity in the form of supervision of the generative options.

In another particular embodiment, in which the human-machine interface comprises display means, for example a touch screen, configured for displaying all the acquisition devices together with the images captured by these acquisition devices, selection may be done manually by the operator and may consist of navigating successively from one acquisition device to another by means of switching means and of stopping on the acquisition device finally selected, so as to generate a selection command for the attention of the processing device.

Thus, in this mode, the operator selects a given acquisition device directly as a function of the visual appearance of the images that it captures. This image capture mode is particularly interesting for its control aspect, and the creative control that it offers to a human operator. In particular, the operator may control several aspects of the video sequence, in particular by controlling the framing, zoom, viewing angle, direction of movement, as well as the relative speed of motion of the virtual sensor in relation to the moving object (i.e. the sportsperson or the sports equipment).

In the course of a step 430, a portion or part of the image filmed at the instant $t_i$ by the selected acquisition device $C_i$ is selected.

For example, at the instant $t_i=t_1$, the image portion 310 shown in FIG. 3 may be selected.

In embodiments, the operator may select an image portion via the human-machine interface, and the aforementioned switching means are configured for switching as a function of the image portion selected. In this case, the display means are additionally configured for displaying a signalling element delimiting the image portion selected (e.g. 310 in FIG. 3).

Thus, the display device allows the user of the system 102 (e.g. the camera operator) to navigate in the image captured by the selected acquisition device in order to select a portion therein defined by a frame zoomed to a greater or lesser extent, which they control to their liking. To do this, they have the possibility of moving the frame at will, for example from left to right, and from top to bottom, on the image displayed by the display means (e.g. screen).

According to a particular example, the image portion filmed at a given instant may be selected automatically as a function of a relative speed of the virtual sensor produced and of the predefined vehicle observed 105. Thus, selection of the image portion at a given instant is carried out automatically by the system so as to respect this relative speed during the video sequence to be reconstructed.

During an optional step 440, the image portion selected is processed in order to avoid image jumping between two successive instants (e.g. $t_i$ and $t_{i-1}$) of the video sequence. This linearization treatment makes it possible to ensure a smooth transition between the different images of a video sequence.

For this purpose, several types of processing may be applied in order to give a better impression of the speed of the sportspersons or sports equipment filmed. This processing may for example use the linearization function pre-calculated in the aforementioned preliminary step. The aim thereof is to smooth the transition between two selected image portions. As an example, this makes it possible to ensure that the same horizontal is shared by all the acquisition devices.

In order to improve the transition between image portions it is for example possible to use a recording of the selection commands resulting from the operator's action on the human-machine interface during several successive iterations. As an illustration, when these commands result from the movement of a lever along a groove, it is possible for example to take a simple average of these commands or apply a low-pass filter on these commands in order to avoid jolts and other jerks between the image portions selected. In this case, smoothing is carried out on several successive iterations.

According to another example, a tracking algorithm may be used for detecting and tracking a sportsperson or sports equipment and thus allow the operator to control the virtual sensor relative to a vehicle in the field.

In fact, tracking makes it possible to follow a sportsperson (or equipment) and therefore control the virtual sensor by fixing a relative distance or a relative speed between the latter (the concept of "snapping" the virtual sensor to the subject observed).

Advantageously, tracking makes it possible to avoid image jumping over time when the speed of movement of the sportsperson or equipment allows capture of a sufficient number of images as a function of the spacing of the acquisition devices, i.e. for example for a conventional fisheye camera, 25 images/s.

Then, at the next instant (450), steps 410 to 440 are repeated so as to allow the gradual reconstruction (445), from the image portions selected during the different iterations, of a video sequence similar to that which would have been captured by an acquisition device moving along said course.

Thus, for example, the image portions 310, 322, 334, 344 and 356 shown in FIG. 3 may constitute a video sequence resulting from several iterations of the aforementioned steps.

Depending on the distance between the acquisition devices arranged along the course from which the image portions are selected, the relative speed of the sportsperson or sports equipment and the virtual sensor may vary during the reconstructed video sequence without requiring interpolation. In other words, it is possible to vary the impression of speed in the video sequence by selecting image portions captured by acquisition devices at greater or smaller distances from one another. Thus, the greater the distance between the acquisition devices from which the image portions are selected, the greater the increase in speed. Correspondingly, the greater the number of acquisition devices on the course, the closer they are to one another and the greater the impression of relative speed.

In an embodiment, the images captured by the acquisition devices are kept in the system's memory for a predetermined duration, so as to allow the operator to reconstruct a video sequence a posteriori, for example to return to a past action with specific parameters (viewing angle, speed, zoom, framing, etc.). For example, the predetermined duration may be from a few minutes to 10 minutes or more. The buffer used for doing this may replace the stored data at the end of this predetermined duration. This predetermined duration may be selected by the operator or it may be imposed by default by the facilities of the system.

Figure 5:
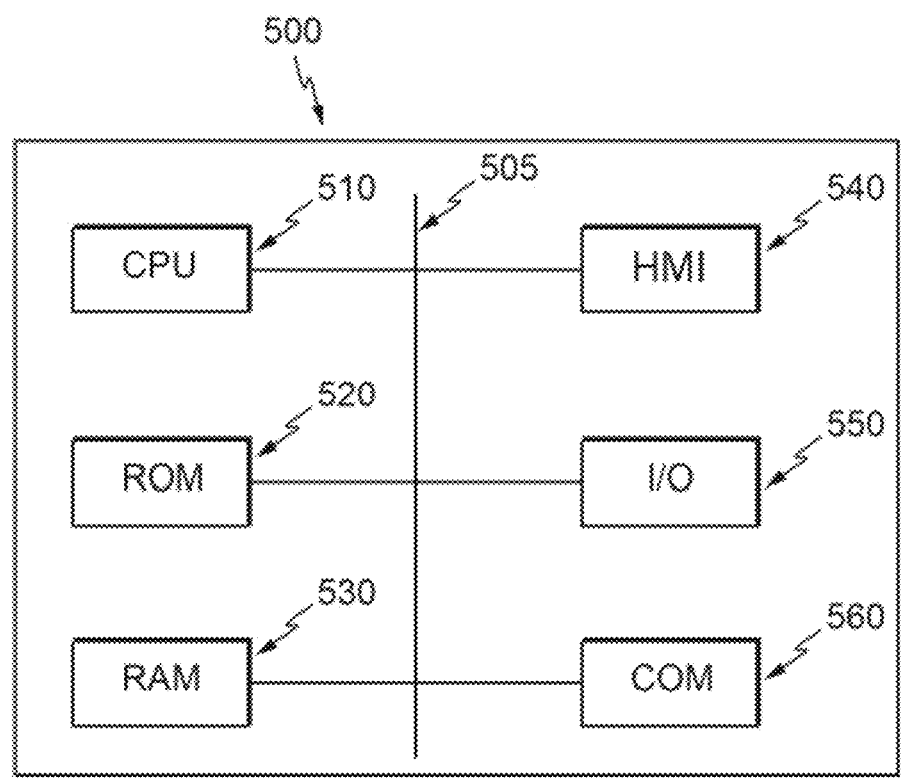
FIG. 5 illustrates an example of material architecture for an image capture system according to particular embodiments of the invention.

FIG. 5 illustrates an example of material architecture for the element or elements constituting an image capture system according to embodiments of the invention, for example as described with reference to FIG. 1.

In this example, the architecture 500 comprises a communication bus 505 to which are connected:

- a processing unit—or microprocessor—designated CPU 510 (CPU: Central Processing Unit);
- one or more non-volatile memories 520, for example ROM (Read Only Memory), which may comprise a computer program comprising instructions for implementing an image capture method according to the invention; this non-volatile memory may also be an EEPROM memory (Electrically Erasable Read Only Memory) or else a flash memory; this memory may allow temporary storage of the images captured by the acquisition devices of the system for a predetermined duration, so as to allow the operator to reconstruct a video sequence a posteriori;
- a random-access memory or cache memory or volatile memory, for example RAM 530 (RAM: Random-Access Memory), comprising registers suitable for recording the variables and parameters created and modified during execution of the aforementioned program; while carrying out the invention, the program code instructions stored in non-volatile memory (e.g. EEPROM or flash) are loaded into RAM to be executed by the processing unit (CPU);
- a human-machine interface HMI 540, for example a screen, a keyboard, a mouse, a lever (e.g. joystick or steering wheel), one or more pedals, a touch screen or a remote control; this I/O interface allows a user (for example a camera operator) to interact with the system while carrying out the method via a graphical interface;
- input/output interfaces I/O 550, in order to connect the acquisition devices of the system (not shown), and optionally one or more peripherals, for example a light projector;
- a communication interface 560, suitable for transmitting and receiving data, for example via a telecommunications network.

The communication bus 505 allows communication and interoperability between the various elements included in the system or connected to it. The representation of the bus is non-limitative and, in particular, the processing unit 510 is able to communicate instructions to any element of the system directly or via another element of this system.

According to the invention, the processing unit 520 of the image capture system comprises an image processing module configured for:

obtaining images captured in real time by the acquisition devices 110, 120, 130, 140, 150, 160, 170, 180, 190, 195 via the input/output interfaces I/O 550;

selecting, for each instant of a plurality of successive instants, a portion of the image captured at said instant by a given acquisition device; and reconstructing, from the selected image portions, a video sequence similar to that which would have been captured by an acquisition device moving along said course.

In certain embodiments, the processing module is configured in particular for processing the selected image portions in order to avoid image jumping between two successive instants of the video sequence. Thus, this module may in addition be configured for correcting the optical distortion of the images captured by the acquisition devices.

In certain embodiments, the human-machine interface 540 comprises display means configured for displaying all of the acquisition devices 110, 120, 130, 140, 150, 160, 170, 180, 190, 195 together with the images captured by these acquisition devices. It may also comprise switching means configured for switching from a given acquisition device to another so as to generate a selection command for the attention of the processing module.

These switching means may be configured for switching from a given acquisition device to another acquisition device as a function of an image portion selected via the human-machine interface, and the display means may display a signalling element delimiting the image portion selected, as shown with dashed lines in FIG. 3.

In certain embodiments, the human-machine interface may be handled by several operators at once, or the system may comprise several human-machine interfaces. In this case, an order of priority may be set up for prioritizing certain commands relative to others.

In certain embodiments, certain steps may be carried out in the acquisition devices, whereas other steps may be carried out by the system 500.

Naturally, to meet specific needs, a person competent in the field of the invention will be able to apply modifications in the description given above.

The foregoing examples are only embodiments of the invention which is not limited thereto.

The invention claimed is:

1. An image capture method for tracking a sportsperson or sports equipment moving at high speed over a predetermined course of a scene, implemented in an image capture system equipped with a plurality of acquisition devices for wide-field images, each one of said acquisition devices arranged at a different fixed position along the predetermined course so that images captured at a given instant by two different ones of said acquisition devices represent different viewpoints of the sportsperson or sports equipment moving over the predetermined course, the method comprising:

capturing, at each instant of a plurality of successive instants, images representative of a zone of space substantially equivalent to the predetermined course, by each acquisition device of said plurality of acquisition devices;

selecting, for each instant of a plurality of successive instants, a respective image among the images captured by all the acquisition devices at said instant, at least two of the selected images captured by at least two different acquisition devices among the plurality of acquisition devices;

extracting, from each selected image, a respective image portion comprising a respective viewpoint of the sportsperson or sports equipment, wherein for each pair of two image portions respectively associated with two successive instants of the plurality of successive instants, a transition between said two successive instants is processed by smoothing so that no image jumping occurs in a movement of the sportsperson or sports equipment between the two images portions of the pair, such that a video sequence reconstructed from all the extracted successive portions is similar to another video sequence which would have been captured continuously by a single mobile acquisition device moving alongside said sportsperson or sports equipment; and reconstructing said video sequence from the image portions.

2. The method according to claim 1, further comprising: correcting an optical distortion of the images captured by the acquisition devices.

3. The method according to claim 1, wherein a relative speed of the sportsperson or sports equipment and a virtual sensor varies during the reconstructed video sequence.

4. The method according to claim 1, further comprising: storing said captured images in the system for a predetermined duration in order to allow subsequent execution of new steps of selection and reconstruction from the stored images.

5. The method according to claim 1, further comprising: preliminary setting up of the image capture system including sub-steps of:

installing the plurality of acquisition devices along the predetermined course, in such a way that each one of said acquisition devices films a zone of space substantially equivalent to the predetermined course, and in such a way that the images captured at the given instant by the two different ones of said acquisition devices represent different viewpoints of the sportsperson or sports equipment moving over the predetermined course; and parameterizing an image processing device to which each acquisition device of the plurality of said acquisition devices is connected, with data of relative positions of the acquisition devices.

6. An image capture system for tracking a sportsperson or sports equipment moving at high speed over a predetermined course of a scene, the system comprising:

a plurality of acquisition devices of wide-field images, each acquisition device arranged at a different fixed position along the predetermined course, so that images captured at a given instant by two different acquisition devices represent different viewpoints of the sportsperson or sports equipment moving over the predetermined course, each acquisition device configured to capture, at each instant of a plurality of successive instants, images that are representative of a zone of space substantially equivalent to the predetermined course; and an image processing device configured for:

obtaining said images captured by the acquisition devices;

selecting, for each instant of a plurality of successive instants, a respective image among the images captured by all the acquisition devices at said instant, at least two of the selected images captured by at least two different acquisition devices among the plurality of acquisition devices;

extracting, from each selected image, a respective image portion comprising a respective viewpoint of the sportsperson or sports equipment, wherein for each pair of two image portions respectively associated with two successive instants of the plurality of successive instants, a transition between said two successive instants is processed by smoothing so that no image jumping occurs in a movement of the sportsperson or sports equipment between the two images portions of the pair; and reconstructing said video sequence from the image portions, such that said video sequence, reconstructed from all the extracted successive portions, is similar to a video sequence which would have been captured continuously by a single mobile acquisition device moving alongside said sportsperson or sports equipment.

7. The image capture system according to claim 6, wherein the image processing device is further configured to correct an optical distortion of the images captured by the acquisition devices.

8. The image capture system according to claim 6, further comprising:
a human-machine interface that displays all of the acquisition devices together with the images captured by said acquisition devices.

9. The image capture system according to claim 8, wherein the human-machine interface is configured to switch from a first of said acquisition devices to a second of said acquisition devices so as to generate a selection command for attention of the image processing device.

10. The image capture system according to claim 9, wherein the human-machine interface is configured to switch from the first of said acquisition devices to the second of said acquisition devices as a function of an image portion selected via the human-machine interface, the human-machine interface being additionally configured to display a signalling element delimiting the image portion selected.

11. The method according to claim 2, wherein a relative speed of the sportsperson or sports equipment and a virtual sensor varies during the reconstructed video sequence.

12. The method according to claim 2, further comprising:
storing said captured images in the system, for a predetermined duration, in order to allow subsequent execution of new steps of selection and of reconstruction, from the stored images.

13. The method according to claim 3, further comprising:
storing said captured images in the system, for a predetermined duration, in order to allow subsequent execution of new steps of selection and of reconstruction, from the stored images.

14. The method according to claim 2, further comprising:
preliminary setting up of the image capture system including sub-steps of:
installing the plurality of acquisition devices along the predetermined course, in such a way that each one of said acquisition devices films a zone of space substantially equivalent to the predetermined course, and in such a way that the images captured at the given instant by the two different ones of said acquisition devices represent different viewpoints of the sportsperson or sports equipment moving over the predetermined course; and
parameterizing an image processing device to which each acquisition device of the plurality of said acquisition devices is connected, with data of relative positions of the acquisition devices.

* * * * *